Patented Nov. 30, 1943

2,335,691

UNITED STATES PATENT OFFICE 2,335,691

METHOD OF PREPARING DIOLEFINS

Henry O. Mottern, Elizabeth, N. J., assignor, by mesne assignments, to Jasco, Incorporated, a corporation of Louisiana No Drawing. Application December 20, 1940, Serial No. 370,966

15 Claims. (Cl. 260—681)

The present invention involves a process for the conversion of aliphatic mono-olefins to conjugated diolefins.

Diolefins have previously been prepared by such methods as the dehydration of the corresponding glycol or unsaturated alcohol, the dehydrochlorination of corresponding dichloride or unsaturated chloride, and the dehydrogenation of mono-olefinic or paraffinic hydrocarbon. Other methods have also been used, but they are rather involved and uneconomical; also, in most cases, they are not applicable to the production of all conjugated diolefins. The method of the present invention is applicable not only to the synthesis of diolefins available by other chemical methods, but also to the preparation of conjugated diolefins which have not heretofore been synthesized by any method.

According to the present invention, conjugated diolefins are prepared by a process involving the condensation of aliphatic mono-olefins with formaldehyde in the presence of an acid-reacting catalyst of between 10 and 85% acid concentration, diluting the reaction mixture containing the condensate with water until the acid concentration has been brought below 5% and then steam-distilling to recover the conjugated diene.

Olefinic materials suitable for use in the process of the present invention are such olefins as propylene, isobutylene, butene-1, butene-2, trimethylethylene, methylethylethylene, pentene-2, cyclo hexene, etc. Also, mixtures of olefins and paraffinic hydrocarbon may be used.

The aldehydes used in carrying out the process of this invention may be aliphatic, such as formaldehyde (formalin), acetaldehyde, and propion aldehyde, or any compound such as polymers of aldehyde, e. g., paraformaldehyde (trioxymethylene), which will decompose to yield an aldehyde under the reaction conditions, can be used as the aldehyde portion of the feed. Catalysts which are effective in promoting the reactions involved in this invention are acidic in character, such as the mineral acids, strong organic acids and mineral acid-acting compounds (e. g., mineral acid-acting salts), and other substances which are capable of acting as mineral acids in the presence of water or under the conditions of the reaction. Mineral acid catalysts include HCl, $H_2SO_4$, $HNO_3$, HBr, $H_3PO_4$, $H_2S_2O_7$, $HPO_3$, $H_4P_2O_7$, HF, $ClSO_3H$, $FSO_3H$, silicotungstic acid, fluosilicic acid, and the like. The following mineral acid-acting salt catalysts may be mentioned: $FeCl_3$, $ZnCl_2$, $ZnSO_4$, $AlCl_3$, $Fe_2(SO_4)_3$, $NaHSO_4$, $Al_2(SO_4)_3$, $NaH_2PO_4$, etc. Illustrative of the compounds which form acids with water and which may be used in the presence of water and catalyst for the reaction are $SO_2Cl_2$, $SOCl_2$, $SOBr_2$, $SO_2$, $S_2O_3$, $N_2O_3$, NOCl, $PCl_3$, $PCl_5$, $POCl_3$, and $Cl_2$.

Strong organic acids of the same relative acidity may be substituted for the inorganic acids or inorganic acid salt as catalyst in the reaction.

In the first stage in the process of this invention, olefins and aldehydes are condensed in the presence of catalyst solutions of between 10 and 85% concentration at temperatures and pressures capable of maintaining an appreciable concentration of olefin in the reaction mixture. In the reaction, the mol ratio of formaldehyde to olefin is preferably kept at 2 mols or more formaldehyde per mol of olefin, but, the maintenance of this ratio is not requisite since the reaction proceeds according to the 2:1 ratio regardless of the preponderance of one or the other reactants. There are preferred acid concentration ranges for the various types of olefins as, for example, primary olefins require acids of from 50% to 85% concentration for the reaction, that is, using propylene, 83% acid is quite satisfactory at room temperature. The more reactive secondary and tertiary olefins require a correspondingly more dilute acid in order to prevent polymerization of the original olefin and esterification and polymerization of the products, thus isobutylene can be reacted with 10–40% acid and butene-2 with 40–60% acid. The reaction may be brought about by passing an olefin, mixtures of olefins or mixtures of olefins and saturated hydrocarbons, either in liquid or vapor state, into a slurry of aldehyde, such as paraformaldehyde, in sufficient liquid catalyst to make the mixture fluid, or the aldehyde can be suspended in a high boiling inert diluent, such as saturated hydrocarbon, white oil with the catalyst added thereto, and the olefins passed into this mixture. Room temperature or slightly above is the preferred temperature. However, the reaction may be speeded up by increases in temperature. The best results are obtained by carefully selecting both temperature and acid strength for the particular olefin employed. The time of reaction varies with acid strength and temperature, and may take from a few minutes to several hours. When the reaction is completed, which is indicated by a slowly dropping temperature or complete solution of the aldehyde where a solid form of aldehyde has been used, the reaction mixture is diluted with sufficient water to bring the acid concentration of the catalyst to within the range of from 1 to 5%. The mixture is then steam-distilled and the diolefin with some water collected as a distillate. The distillate forms two layers the lower of which is water and the upper diolefins. The diolefin is removed by decantation, dried over a dehydrating salt such as potassium carbonate and purified by redistillation.

Representative examples of conjugated diolefins which can be prepared by the process of the present invention are as follows: 2-methyl butadiene, 1-methyl butadiene, 2,3-dimethyl butadiene, 1,3-dimethyl butadiene, 1,2,3-trimethyl butadiene; 2-ethyl, 3-methyl butadiene; 2-methyl, 3-isobutyl butadiene; 2-phenyl butadiene; etc.

The diolefins made in accordance with this invention are useful in the preparation of synthetic rubber, as intermediates for further chemical reactions, and as anti-knock blending agents for gasoline.

The following example is given for the purpose of illustrating the invention:

*Example*

103 parts by weight of 20% sulfuric acid, 240 parts by weight of paraformaldehyde, and 224 parts by weight of isobutylene were reacted for 8 hours in a pressure vessel equipped with a mechanical agitator. The mixture was then conveyed into a distilling tower where it was diluted with 500 parts by weight of water and then steam-distilled with open steam. The distillate boiling up to 38° C. was collected. The distillate on standing formed two layers, the upper of which was removed, dried over potassium carbonate, filtered to remove the potassium carbonate and the filtrate redistilled, yielding 13 parts by weight of 2-methyl butadiene-1,3.

What is claimed is:

1. A process for the production of conjugated diolefins which comprises condensing an olefin of at least 3 carbon atoms with formaldehyde in the presence of an aqueous acid-acting catalyst of from 10% to 85% acid concentration, diluting the reacted mass with sufficient water to yield a mixture containing an aqueous acid-reacting catalyst of from 1% to 5% acid concentration and distilling to recover the diolefins.

2. A process for the production of conjugated diolefins which comprises condensing a primary olefin with an aldehyde in the presence of an aqueous acid-acting catalyst of from 50% to 85% acid concentration, diluting the reacted mass with sufficient water to yield a mixture containing an aqueous acid-reacting catalyst of from 1% to 5% acid concentration and distilling to recover the diolefins.

3. A process for the production of conjugated diolefins which comprises condensing a secondary olefin with an aldehyde in the presence of an aqueous acid-acting catalyst of from 40% to 60% acid concentration, diluting the reacted mass with sufficient water to yield a mixture containing an aqueous acid-reacting catalyst of from 1% to 5% acid concentration and distilling to recover the diolefins.

4. A process for the production of conjugated diolefins which comprises condensing a tertiary olefin with an aldehyde in the presence of an aqueous acid-acting catalyst of from 10% to 40% acid concentration, diluting the reacted mass with sufficient water to yield a mixture containing an aqueous acid-reacting catalyst of from 1% to 5% acid concentration and distilling to recover the diolefins.

5. A process for the production of conjugated diolefins which comprises condensing an olefin of at least 3 carbon atoms with an aldehyde in the presence of aqueous sulfuric acid of from 10% to 85% acid concentration, diluting the reacted mass with sufficient water to yield a mixture containing aqueous sulfuric acid of from 1% to 5% acid concentration and distilling to recover the diolefins.

6. A process for the production of conjugated diolefins which comprises condensing a primary olefin with an aldehyde in the presence of aqueous sulfuric acid of from 50% to 85% acid concentration, diluting the reacted mass with sufficient water to yield a mixture containing aqueous sulfuric acid of from 1% to 5% acid concentration and distilling to recover the diolefins.

7. A process for the production of conjugated diolefins which comprises condensing a secondary olefin with an aldehyde in the presence of aqueous sulfuric acid of from 40% to 60% acid concentration, diluting the reacted mass with sufficient water to yield a mixture containing aqueous sulfuric acid of from 1% to 5% acid concentration and distilling to recover the diolefins.

8. A process for the production of conjugated diolefins which comprises condensing a tertiary olefin with an aldehyde in the presence of aqueous sulfuric acid of from 10% to 40% acid concentration, diluting the reacted mass with sufficient water to yield a mixture containing aqueous sulfuric acid of from 1% to 5% acid concentration and distilling to recover the diolefins.

9. A process for the production of conjugated diolefins which comprises condensing a primary olefin with formaldehyde in the presence of an aqueous acid-reacting catalyst of from 50% to 85% acid concentration, diluting the reacted mass with sufficient water to yield a mixture containing an aqueous acid-reacting catalyst of from 1% to 5% acid concentration and distilling to recover the diolefins.

10. A process for the production of conjugated diolefins which comprises condensing a secondary olefin with formaldehyde in the presence of an aqueous acid-acting catalyst of from 40% to 60% acid concentration, diluting the reacted mass with sufficient water to yield a mixture containing an aqueous acid-reacting catalyst of from 1% to 5% acid concentration and distilling to recover the diolefins.

11. A process for the production of conjugated diolefins which comprises condensing a tertiary olefin with formaldehyde in the presence of an aqueous acid-acting catalyst of from 10% to 40% acid concentration, diluting the reacted mass with sufficient water to yield a mixture containing an aqueous acid-reacting catalyst of from 1% to 5% acid concentration and distilling to recover the diolefins.

12. A process for the production of a conjugated diolefin which comprises condensing isobutylene with an aldehyde in the presence of an aqueous acid-reacting catalyst of from 10% to 40% acid concentration, diluting the reacted mass with sufficient water to yield a mixture containing an aqueous acid-reacting catalyst of from 1% to 5% acid concentration and distilling to recover the diolefins.

13. A process for the production of 2-methyl-butadiene-1,3 which comprises condensing isobutylene with formaldehyde in the presence of an aqueous acid-acting catalyst of from 10% to 40% acid concentration, diluting the reacted mass with sufficient water to yield a mixture containing an aqueous acid-reacting catalyst of from 1% to 5% acid concentration and distilling to recover the 2-methylbutadiene-1,3.

14. A process for the production of 2-methylbutadiene-1,3 which comprises condensing isobutylene with formaldehyde in the presence of aqueous sulfuric acid of from 10% to 40% acid concentration, diluting the reacted mass with sufficient water to yield a mixture containing aqueous sulfuric acid of from 1% to 5% acid concentration and distilling to recover the diolefins.

15. A process for the production of 2-methylbutadiene-1,3 which comprises condensing isobutylene with formaldehyde in the presence of 20% aqueous sulfuric acid, diluting the reacted mass with sufficient water to yield a mixture containing aqueous sulfuric acid of 5% acid concentration and distilling to recover the diolefins.

HENRY O. MOTTERN.